United States Patent Office 3,118,809
Patented Jan. 21, 1964

3,118,809
METHOD OF LOWERING CHOLESTEROL BY PENTAERYTHRITOL TETRAACETATE
Etienne Barbry, Lille, Nord, France, assignor to Boyer & Cie, Paris, France
No Drawing. Filed Oct. 12, 1961, Ser. No. 144,555
Claims priority, application France Jan. 19, 1961
3 Claims. (Cl. 167—55)

This invention relates to the novel therapeutic applications of tetra-acetyl-pentaerythrite having the following formula:

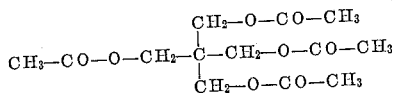

This product in the pure state has the appearance of minute crystalline needles; its molecular weight is 304, it is insoluble in water, soluble in 95° ethanol in the proportion of 1 part in 10 parts; in isopropanol, in the proportion of 1 part in 25 parts; in chloroform, in the proportion of 1 part in 0.8 part. Its acidity number is 0 to 1, its saponification value ranges from 700 to 730, and its hydroxyl value from −5 to +5; these figures correspond to the number of potash milligrams per grams of dry product. It has a bitter taste.

The solidification point of the crystalline needles ranges from 79° C. to 81° C. and is determined on the previously dried product according to the U.S.P. XVI method. The molten product is a colorless, completely clear liquid.

Tetra acetyl-pentaerythrite can be detected through the following reactions:

(1) In a test tube 0.1 gram of product and 2 cc. of pure sulfuric acid are introduced and then heated. The product dissolves completely and yields a colorless solution.

(2) In a test tube 0.1 gram of product, 3 cc. of a freshly prepared 10% aqueous solution of pyrocatechol and 3 cc. of concentrated sulfuric acid are introduced. One or two broken fragments of porcelain are added thereto, and the whole is boiled carefully. A wine-pinkish color develops gradually and an acetic acid odor is perceived.

This product is prepared from pentaerythrite and acetic anhydride in the manner set forth hereinafter:

In a suitable reactor equipped with cooling and heating means as well as with an agitator, a thermometer and a loading duct, 200 grams of pure acetic anhydride are introduced, the agitator is started and a mixture prepared elsewhere and consisting of 3.4 grams of pure sulfuric acid at 66° Bé. and 1.150 grams of 20% oleum is then added.

The temperature is raised to 40° C. and during 45 minutes 40 grams of dry pentaerythrite are added as regularly as possible by adjusting the temperature (tending to rise as a consequence of the reaction) to about 52° C.

When this addition is nearly completed the loading orifice is sealed and the temperature of the reacting mixture increased to 60° C. and maintained at this value during 90 minutes.

At the end of this time period the mixture is cooled to room temperature and then poured while stirring very rapidly with the agitator into 2.500 litres of cold water. The acid mother liquors are decanted and thrown away. Another dispersion of the product is effected in 2.500 litres of cold water, and then the product is dried by centrifugation, washed with large quantities of water on the centrifugal drier, until a scarcely acid reaction is obtained, and the final product thus obtained is dried in a hot-air oven in which a temperature not exceeding 60° is maintained.

The raw and dry product is dissolved in the hot state in 0.100 litre of 99% isopropanol; as it cools the pure product crystallizes into fine needles. It is subsequently centrifugated and dried in a hot-air oven at a temperature not over 60° C.

The product thus obtained is tetra-acetyl-pentaerythrite, its molecular weight is 304.

Tetra acetyl-pentaerythrite is characterized chiefly by a hypocholesterolemizing action and by an antiatheromatous action. In a relatively great number of cases it is observed that the improvement continues after the treatment has ceased, and that more particularly the reduction in the cholesterol content of the blood is maintained. It appears that tetra acetyl-pentaerythrite has a considerable influence on the lipidic metabolism of the human body, for interesting modification in the rate of cholesterol or in the phenol Kunkel reaction have been observed.

This product has a zero toxicity, the DL 50 is well above 1,000 cc. per kilogram in the mouse when administered in the form of subcutaneous injection.

The tolerance is satisfactory; neither diarrhea, nor neurological accidents, nor cutaneous disorders resulting from an inability to tolerate the product were observed. The administration of the product is not attended by any consequence on the blood formula.

Tests for detecting the chronical toxicity have been made on groups of rabbits weighing about 2 kilograms each, which were treated as follows.

1st group: standard balanced diet;
2nd group: same diet, plus 0.5 gram of cholesterol and 12 cc. of olive oil per day and per animal;
3rd group: same diet as for second group, plus 1 gram of product per day and per animal.

The results obtained under these conditions show that the animals forming the third group have no troubles, notably of digestive order, and display a normal ponderal growth; then the rate of cholesterol of the third group is intermediate the rates found in the first and second groups. After eight weeks, anatomic and pathological examination shows that neither lipidic overload at the liver level nor any atherosclerotic lesion are observed on the arterial wall.

From clinical applications made by the applicant, it appears that tetra acetyl-pentaerythrite produces a substantial decrease in the cholesterol content of the blood, as proved by the following notes; therefore, this product is particularly efficient for treating hypercholesterolemia and arterial atheroma.

*Note No. 1.*—The cholesterol content of blood was found to be 3 grams. The treatment consisted in administering five 1-gram cachets daily during fifteen days; the cholesterol content dropped to 1.87 grams. The blood formula was unchanged.

*Note No. 2.*—The cholesterol content of blood was 2.34 grams. The same treatment was applied. The cholesterol content dropped to 1.60 grams.

*Note No. 3.*—Initial cholesterol content=3.60 grams. Esterified cholesterol=2.30 grams. The treatment consisted of nine tablets of 0.50 gram each per day, in combination with a hypolipidic diet.

After a one-month treatment, the cholesterol content dropped to 2.15 and the esterified cholesterol to 1.15 grams.

*Note No. 4.*—The serum was lactescent. The patients were treated with twelve and then nine tablets per day. The following results were observed:

| Date | Jan. 25 | March 2 | March 31 | May 5 |
|---|---|---|---|---|
| Lipids | 28.6 | 19 | 16.2 | 9.4 |
| Total cholesterol | 7.2 | 6.3 | 6.6 | 3.2 |
| Esterified cholesterol | 4.3 | 4.0 | | |

The last examination showed a perfectly clear serum.

As a rule, the treatments lasted from four to eight weeks and the product was administered at the rate of six to twelve pills containing 0.50 gram of the product. The tolerance was very good and in no case the treatment had to be discontinued.

The cachets, tablets, pills and the like were prepared with the excipients commonly used for pharmaceutical products of this character.

What I claim is:

1. A method of treating hypercholesterolemia and arterial atheroma by administering per as to a patient from about 3 grams to about 6 grams per day of tetra-acetyl-pentaerythrite during several weeks.

2. A method as set forth in claim 1, wherein said tetra acetyl pentaerythrite is in the form of cachets each containing 1 gram thereof.

3. A method as set forth in claim 1, wherein said tetra acetyl-pentaerythrite is in the form of tablets and pills each containing 0.50 gram thereof.

References Cited in the file of this patent

Chem. Abst., vol. 42, p. 2578(*a*), 1948.
Chem. Abst., vol. 44, p. 5312(*e*), 1950.
Chem. Abst., vol. 45, p. 5622(*g*), 1951.